Nov. 7, 1944.
C. W. BRYANT
2,362,349
FLUID MOTOR BYPASS VALVE
Filed Jan. 19, 1942
2 Sheets-Sheet 1
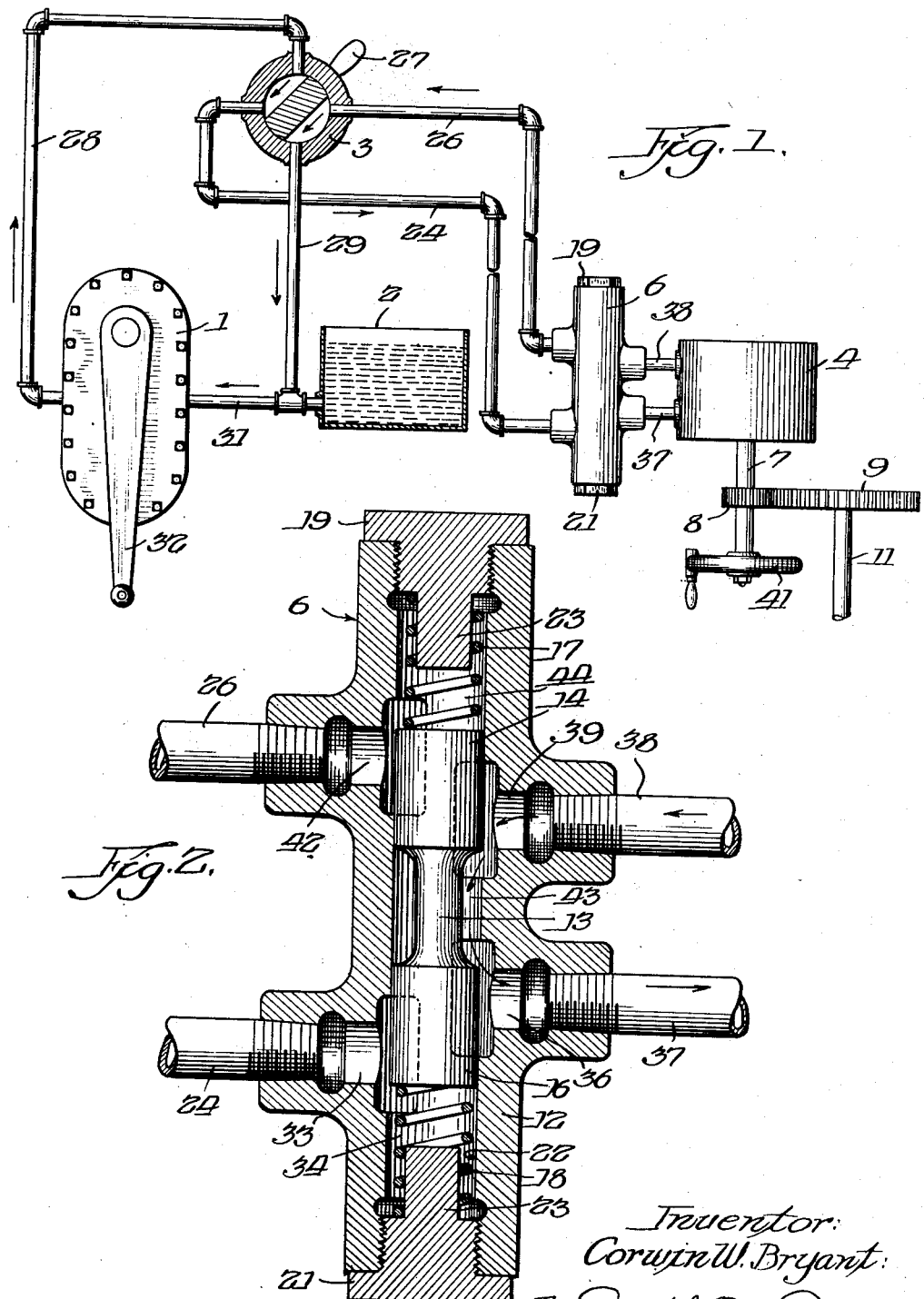

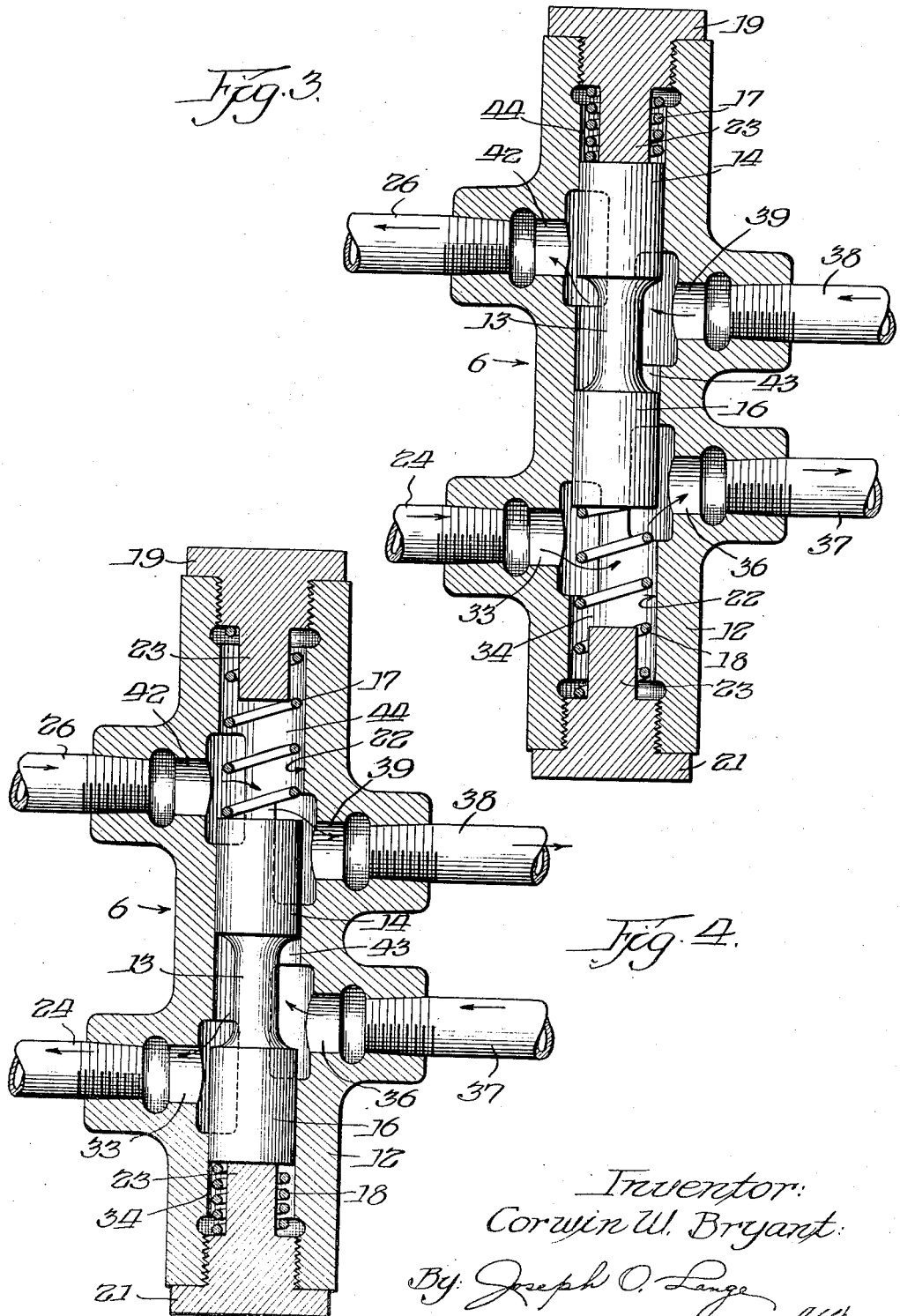

Patented Nov. 7, 1944

2,362,349

UNITED STATES PATENT OFFICE 2,362,349

FLUID MOTOR BYPASS VALVE

Corwin W. Bryant, Downers Grove, Ill., assignor to Crane Co., Chicago, Ill., a corporation of Illinois Application January 19, 1942, Serial No. 427,247

7 Claims. (Cl. 60—53)

This invention appertains generally to a fluid motor bypass valve for use in controlling fluid pressure systems, and more particularly relates to a novel type of auxiliary bypass valve adaptable to control the flow of fluid to a pressure fluid motor of the kind used in the hydraulic operation of valves and the like. While the preferred adaptation herein disclosed refers essentially to valve operation, it will be apparent that other devices having rotatable shafts, stems or rods may be equally well actuated by the means described and claimed.

Before stating the specific objects of my invention it is thought desirable at the outset to make a brief statement regarding some of the special applications of my bypass device, together with a brief outline or review concerning the state of the art prior to the conception of my invention.

One situation where a hydraulic control system employing my device is particularly applicable is in connection with certain valves employed in operating a ship, wherein a high degree of dependability under adverse conditions and an extremely high shock resistance and resistance to the effect of distortion are of paramount importance. In modern naval craft, for example, the operation of valves and other piping equipment has assumed such a high degree of importance, especially with relation to the armored type of vessel constructed for combat service, that the failure of a single valve or a group of valves in the midst of a naval engagement might seriously hamper the fighting effectiveness. As a consequence, it has been found necessary and desirable to provide for the operation of certain critically important valves from a remote location in additon to being operable at the valve itself, in order to improve the accessibility of the valve in the event that rapid or prompt operation is required. These critically important valves are located preferably below the main control deck and in some cases even below the water line in order to minimize the effects of bombs and shell fire. In the past, electrical systems have been commonly employed for the remote operation of such valves but these systems have presented considerable practical difficulties in use due to (1) their excessive bulk and weight, (2) employment of objectionably complex wiring systems, and (3) the obvious requirement of having a live electrical system available at the instant that it is desired to operate the valves. In connection with the last mentioned requirement it will be apparent that inasmuch as certain valves such as those used to flood a powder room in case of fire or an explosion in the vicinity thereof, are primarily utilized only upon the occurrence of an emergency of this sort, there has always been the likelihood that the occurrence of this very emergency which the valve was meant to combat would render the valve useless by destroying or crippling the electrical system. Those responsible for the construction of naval craft have therefore come to realize that somewhat greater dependence should be placed upon personnel than on the electrical systems when an emergency occurs.

In furtherance of this thought and trend, a completely hydraulic system for operating a valve from a plurality of positions has been developed, a form of which is shown diagrammatically in Figure 1 showing how my invention would be specifically applied therewith; basically, the purpose has been to provide a valve operating system wherein the valve may be operated by hand at points located both far from and near to the valve.

In order to manually operate a valve from a distant point within a ship, a fluid piped connection between the operating deck and the valve has been deemed superior to a mechanical connection, as for instance an extended stem; in the first place a pair of fluid-containing pipes or tubes would occupy less space which is always at a premium aboard ship, and in the second place, by their flexible nature, they would be more likely to remain in an operative condition even if deformed from their original configuration by an explosion or the like causing the buckling of supports.

A satisfactory pressure fluid-operated system of the type referred to provides primarily a hand operated pump and a reservoir for fluid (usually oil) located at the remote control deck; at the main valve and connected operatively to the stem thereof is a pressure operated fluid motor of the rotary type, or of the piston and cylinder type, adapted to be actuated by the remotely positioned pump; such an installation also includes, in case a unidirectional pump is used, a reversing valve or cock on the control deck and connected into the pump discharge for selectively directing the fluid in one direction or the other through the pressure motor, depending on whether it is desired to cause the main valve to open or to close. Another element which heretofore has been considered necessary is a declutching device of some sort to disconnect the fluid system while the operation of the valve is being effected at the valve itself; the purpose of these prior declutching devices has been to prevent the fluid motor from acting as a pump when operated by the handwheel at the valve proper which would of course cause fluid to back into the pump and the reservoir at the remote operating location thereby introducing considerable fluid friction which the operator would have to overcome in addition to the resistance normally encountered in the operation of the valve itself.

In a fluid pressure operating system for a valve or the like as above described it has been a primary object to construct a device which would eliminate the need for the declutching device; my invention accomplishes this result by causing the fluid to be bypassed through a relatively short circuit adjacent to the fluid motor in the event of operation of the valve by the valve handwheel. Thus, my invention simplifies the construction of such a fluid system to a desirable extent by eliminating the necessity for any mechanical declutching devices, and it accomplishes this result without the objection of having actuating fluid flowing through the entire fluid system when the valve handwheel is being turned.

A specific object of my invention has been to provide a fully automatic combination bypass and diverter valve for fluid systems such as above described. In one form the device is preferably installed in the fluid connections between the reversing valve or cock and the pressure motor, adjacent to the latter. By means of a spring-loaded piston or the like within the bypass device, it is flexibly yieldable in operation to pressure drop existing across the fluid connections whereby it permits fluid to flow to the motor in any desired direction called for by the setting of the reversing cock or valve; yet, when there is no tendency to pass fluid from the pump to the motor, the bypass device automatically adjusts itself to the condition whereby the actuating fluid may be bypassed directly from one side of the pressure motor to the other through a short circuit in the event that it is being independently operated (for instance by the handwheel at the valve) as a pump.

In the accompanying drawings there is shown for purposes of illustration, and not by way of limitation, one form of construction which my invention may assume in practice.

Other advantages of my invention will become apparent in connection with the following description and drawings, in which Fig. 1 is a diagrammatic view, with the four-way valve or cock shown in cross-section, and illustrates my invention as it would be incorporated within a valve actuating system.

Fig. 2 is an enlarged sectional view of the novel bypass valve representing the essence of my invention.

Figs. 3 and 4 are similar to Fig. 2 except that the interior elements of the bypass valve are shown in different working positions.

Throughout the drawings like parts are designated by like reference characters.

Referring now to the drawings and particularly to Fig. 1, the fluid pump generally designated 1 operates to draw fluid from the replenishing tank 2 and discharges it through the reversing valve or four-way cock 3 to the fluid motor 4. The bypass device or auxiliary control valve which is my inventive contribution is generally designated by the numeral 6 and is shown as it would normally be positioned in the fluid system between the reversing valve and the fluid motor, adjacent the fluid motor. It will be apparent that from the standpoint of equivalents, other modifications may be used as substitutions for the elements named; for instance the pump 1, although shown as a rotary type gear pump, may obviously be any other type, as for instance a reciprocating pump; and the fluid motor may be a rotary type, as shown, or a substantial equivalent might readily take the form of the conventional piston and cylinder type. The fluid motor rotor shaft 7 has fixedly connected thereto a spur gear pinion 8 which is operatively engaged with a similar spur gear 9, the latter being attached to a valve stem 11 or a like part to which it is desired to transmit either rotary or reciprocal motion, depending upon the type of installation with which the device is used.

Directing attention now to Fig. 2 showing the details of the unique bypass valve, the latter consists of a ported casing 12 having three movable parts therewithin, namely: the piston member 13 consisting of the fixedly spaced-apart pistons 14 and 16; the spring 17; and the spring 18. Preferably at the upper and lower end limits, the caps 19 and 21 are threadedly engaged with both ends of the cylindrical bore 22 for ready access to the interior parts. Each cap is provided with an inward axial extension 23 to provide stop means for limiting the endwise movement of the piston member 13. It will be noted that no movable members extend to the exterior of the casing whereby there are no fluid losses and there is no necessity for a packing chamber of any kind. It should be understood too that in connection with the movement of the pistons 14 and 16 respectively within their cylinders that lapped or snug fits therebetween are not employed, thus avoiding the positive trapping of fluid within the cylinders as the pistons enter. The usual sliding fit is used instead since the time element in the movement of the pistons is not a factor. Also because of such leakage past each piston a balanced condition is easily obtained by employing resilient means to place the pistons in the balanced position shown in Fig. 2.

To simplify the following detailed description it will be assumed that in Fig. 1 the actuating fluid will flow to the right in supply conduit 24 and to the left in supply conduit 26 when the pump 1 is being operated to close the valve; conversely, when the pump is being operated to open the valve the flow will be opposite in both conduits.

In the usual installation contemplated the pump 1, the replenishing tank 2, and the reversing cock 3 will be located at a control station usually at some distance from the valve or other device which is adapted to be operated, whereas the fluid motor 4, the bypass device or auxiliary control valve 6, and the gearing 8, 9, etc. will preferably be located at the valve itself. Thus if it is desired to cause the valve stem 11 to rotate in an opening direction, the operator moves the control lever 27 of the reversing cock 3 to the open position, as shown in Fig. 1, thereby allowing direct communication between the pump discharge conduit 28 and the conduit 24; and by the same procedure direct communication is likewise established between the conduit 26 and the exhaust conduit 29, the latter serving to convey used fluid back to the replenishing tank 2 or to the inlet 31 of the pump for repeated use. After adjusting the position of the operating lever 27 in this manner the operator needs only to rotate the pump handle 32 to effect opening movement of the valve stem 11, for in doing so fluid is directed through the conduits 28 and 24 and into the inlet or primary port 33 of the casing 12; since this inlet port 33 is in direct communication with the bore chamber 34 at the exterior end of the piston 16, the resulting pressure drop across the piston member 13 causes it to be moved upwardly against the compression of the spring 17 into abutment with the extension 23 of the cap 19 as shown in Fig. 3. The outlet or secondary port 36 is thus uncovered for direct communication with the inlet port 33 whereby actuating fluid is allowed to flow through the passage 37, through the fluid motor 4, returning through the passage 38, passing successively through the outlet or secondary port 39, the inlet or primary port 42, the conduit 26, and the exhaust conduit 29 for recirculation through the pump. The direction of flow through the bypass device 6 at this stage is indicated by the arrows in Fig. 3. During the operation of the pump, the piston member 13 is maintained in abutment against the cap 19 by reason of the pump discharge pressure existing in the chamber 34 as aforesaid.

As soon as the pump has been stopped, obviously the pressure within the bore chamber 34 will decrease and the action of the springs 17 and 18 will cause the piston member 13 to be centered within the casing in the neutral position as shown in Fig. 2 thereby providing a direct connection between the flow passages 37 and 38 leading from the motor 4. Thus, in this position, the valve stem 11 is in immediate readiness to be operated at the valve itself by rotating the handwheel 41 which is directly connected to the valve stem by means of the gears 7 and 9, as shown. This, of course, will tend to operate the motor 4 as a pump, causing the actuating fluid to flow from the flow passage 37 to the flow passage 38, or vice versa. As pointed out above, this tendency to pump fluid in the past has necessitated a declutching mechanism at the valve proper in order to maintain the fluid motor 4 disconnected when not in use for remote operation, for otherwise the operator turning the handwheel 41 would encounter all the fluid friction involved in pumping fluid all the way back through the entire fluid system in addition to the effort normally required to move the valve stem 11. As far as I am advised, the idea has not occurred to anyone previously that a bypass device of this nature could be incorporated into the connections between the reversing valve and the fluid motor wherein an automatic bypass would be effected at the fluid motor itself thus effecting an extremely short circuit compared with the entire fluid system. In this connection, reference is now made to Fig. 2 where the piston member 13 is shown in the central position which it would normally assume when the pump 1 is not in use. The middle portion of the piston member is reduced in size, as indicated, to thereby form a passage 43 and it is apparent that upon the occurrence of movement of the actuating fluid from either of the passages 37 or 38 to the casing 12, it will be bypassed readily through the chamber or passage 43 back to the motor. The arrows in Fig. 2 indicate one direction which the bypassed fluid may flow or flow may be in the reverse direction.

In order to cause the valve stem 11 to be rotated in a closing direction from the remote location, the lever 27 is moved 90 degrees from the position shown in Fig. 1 thereby directly connecting conduits 24 and 29 and conduits 26 and 28. Then when the pump handle 32 is rotated, fluid will be discharged from conduit 28 into conduit 26, and through the inlet port 42. Since this inlet port 42 is in direct communication with the chamber 44 at the end of the piston 14, the pressure discharge therewithin will force the piston member 13 downward and against the compression of the spring 18 into abutting contact with the extension 23 of the cap 21, as shown in Fig. 4. The actuating fluid of the system will then be free to flow from the conduit 26 to the fluid passage 38, through the motor 4, then through the flow passage 37 and return by way of the conduit 24 to accomplish closing movement of the valve stem 11. The latter cycle of flow is indicated by the arrows in Fig. 4. When the operator ceases turning the pump handle 32 the springs 17 and 18 will again cause the piston member 13 to assume a central position within the casing as above described in connection with Fig. 2. To assure that the piston will remain full of fluid and hence ready for instantaneous operation at all times and not be emptied by gravity flow to the replenishing tank 2, a check valve (not shown) may be installed in the exhaust conduit 29, if preferred. Such a modification however is not absolutely essential to the successful operation of a fluid system embodying my device, and accordingly has not been included in the drawings.

Whereas my invention has been described in connection with one use where it has been found particularly applicable, namely in naval vessels, it should be obvious that its applicability is not limited to such use for it readily may be used advantageously in connection with any fluid circuit of the type disclosed in which it is desired to hydraulically control a valve or similar device from a plurality of control points. It should likewise be obvious that the invention is equally applicable whether the pump 1 or the handwheel 41 are manually operable as described, or are power operable, as by means of an electrical motor or pneumatic motor, or the like.

While there is in this application specifically illustrated and described one form which the invention may assume in practice, it will of course be understood that the showing provided is for the purpose of illustration only and that the invention may be further modified and embodied in various other forms without departing from its spirit or the scope of the appended claims.

I claim:

1. In a fluid pressure system, a bypass valve for regulating the flow between a fluid pressure motor, a fluid reversing valve and a pump, the latter member having an intake and a discharge for fluid under pressure connected to said reversing valve, the said reversing valve having an exhaust port connected to said pump, a pair of conduits connecting the said reversing valve and the said bypass valve, a pair of fluid passages connecting said bypass valve with said fluid motor, the said bypass valve comprising a ported casing having a cylindrical bore therewithin, a piston member comprising a pair of fixedly spaced-apart pistons axially movable within said bore, resilient means for normally urging the said piston member to a central position with relation to the ends of the said bore, said casing having a primary port connected to one of the said conduits and a secondary port connected to one of the said passages associated with each of said pistons, said casing having said secondary ports so arranged that when said piston member is in the said normal centrally located position within the said bore the secondary ports are directly interconnected within said bore between said pistons whereby fluid may be bypassed freely from one end of said pressure motor to the other, said casing having said primary ports so arranged that when the said piston member is in the said centrally located position no substantial communication is had between the primary and secondary ports and whereby both of said primary ports are partially uncovered by said pistons to provide direct communication between those portions of the said bore at the outer extremities of the pistons and the respective conduits communicating therewith, said piston member being axially movable against said resilient means in the direction of one primary port when fluid under pressure enters the other primary port from its corresponding conduit, said movement of said piston member under pressure allowing fluid from said pump to flow respectively through a primary port and then through a secondary port to the motor intake and out the motor outlet to the remaining secondary and primary ports, the interconnection between the secondary ports being broken when the said piston member is moved from its central position connecting the said ports.

2. In a fluid pressure system, a bypass valve for controlling the flow of fluid between a fluid pressure motor, a fluid reversing valve and a pump having an intake and a discharge for fluid under pressure connected to said reversing valve, said reversing valve having an exhaust port connected to said pump, a pair of conduits connecting said reversing valve and said bypass valve, a pair of fluid passages connecting said bypass valve and said fluid motor; said bypass valve comprising a casing having an axially movable member fitted therewithin, resilient means for normally urging the said axially movable member to a central position within said casing, said casing having a pair of primary ports connected with said conduits and communicating with the interior of said casing, said casing having a pair of secondary ports connecting with the said passages leading to the motor and communicating with the interior of the said casing, the said casing having said secondary ports so spaced and arranged therewithin that the said passages are directly connected when the said axially movable member is centrally located within the casing, said casing having said primary ports so spaced and arranged with relation to each other and to the secondary ports that when said axially movable member is centrally located within the casing the said conduits are in direct communication with the end portions of said axially movable member whereby upon the discharge of fluid under pressure into one or the other of said conduits from the pump said axially movable member is moved axially toward the other conduit and against said resilient means allowing fluid to flow into one or the other of said passages to actuate said fluid pressure motor, whereby when the axially movable member is moved by the pressure to connect one conduit to one of the passages, it simultaneously disconnects the passages from each other and connects the other of said passages to the other conduit.

3. A fluid pressure system comprising, in combination, a fluid pressure motor, means for supplying fluid under pressure for said motor, a reversing valve connected with said fluid pressure motor by means of a plurality of supply conduits, said reversing valve adapted to connect the discharge from the said fluid pressure supply means selectively through said conduits to one of the ends of the said pressure motor and to connect the end of the pressure motor not so connected to the pump discharge to a return flow passageway leading back to the pump intake, a fluid bypass valve interposed in said conduits between said reversing valve and said fluid pressure motor; said bypass valve comprising a casing ported to receive the ends of said conduits leading respectively from the reversing valve and the fluid motor, said casing having a cylindrical bore therewithin, a piston member mounted within said bore and being axially movable with respect to said ported casing, means within the casing for resiliently urging said piston member normally to the center portion of said bore, said casing having ports connected to said conduits and so arranged that when the piston member is in said normal central position those portions of each of said conduits leading to said pressure motor are directly interconnected through the said piston member whereby fluid may be bypassed freely from one end of said pressure motor to the other in the event that the pressure motor is operated by external forces as a pump, the said casing providing that when the fluid is discharged under pressure into one or the other of the said conduits from the pump the piston member is moved axially toward the other conduit allowing fluid to flow into one or the other of a pair of passages connecting the fluid motor with the said bypass valve, whereby when the piston member is moved by the pressure to connect one conduit to one of the passages, it simultaneously disconnects the passages from each other and connects the other of said passages to the other conduit.

4. In a fluid pressure system, a bypass valve for controlling the flow of fluid between a fluid pressure motor, a fluid reversing valve and a pump having an intake connected to an exhaust port of said reversing valve, said pump having a discharge for fluid under pressure connected to said reversing valve, a pair of conduits connecting said reversing valve and said bypass valve, a pair of fluid passages connecting said bypass valve with said fluid motor; said bypass valve consisting of a casing ported to receive said conduits and passages and having a cylindrical bore therewithin, a double-headed control piston mounted in said bore for axial movement relative to said ported casing, resilient means within said casing adapted to resist movement of said piston toward either end of said bore whereby said piston is normally maintained centrally located within said bore, said casing having ports so arranged that when the piston is in said normal central position the said fluid passages leading to said pressure motor are directly interconnected through the said bore within the casing whereby fluid may be bypassed freely from one end of said pressure motor to the other in the event that the motor is independently operated, the casing ports also providing that when fluid is discharged under pressure into one or the other of the said conduits and against the resilient means the said piston is moved axially toward the other conduit to permit fluid to flow into one or the other of the said passages to actuate the fluid motor, whereby when the said piston is moved by pressure to connect one conduit to one of the passages, it simultaneously disconnects the passages from each other and connects the other of said passages to the other conduit.

5. A control valve for a fluid circuit comprising a casing having a cylindrical bore, an axially movable piston member comprising a pair of fixedly spaced-apart pistons positioned within said bore, resilient means for normally urging the said piston member to the center of the said bore, the said casing having a primary port and a secondary port associated with each of said pistons, said casing having said secondary ports so positioned therewithin that when said piston member is in said central position the secondary ports are directly interconnected within said bore through the space between said pistons, the said casing having said primary ports so positioned therewithin that when said piston member is in said central position both of said primary ports are partially uncovered by said pistons to allow direct communication between the primary port and the end portions of said pistons, said casing further having said primary and secondary ports so arranged therewithin with respect to one another and with respect to the said piston member that when the latter is moved axially to either extremity of its travel within the said bore each primary port will be in communication with a secondary port, the interconnection between the said secondary ports being broken when the said piston member is moved from its central position connecting the said ports.

6. A control device for a hydraulic circuit comprising a casing having ports adapted to receive external conduits and having a cylindrical bore therewithin, an axially movable member fitted within said cylindrical bore for movement relative to said casing, means for yieldably maintaining said movable member centrally within said bore, said casing having ports so arranged that when the axially movable member is centrally located therewithin a first pair of said ports are in direct communication with end portions of said axially movable member and a second pair of ports are directly interconnected with one another, the said casing having said first and second pairs of ports so arranged with respect to one another and with respect to the axially movable member that movement of the latter to either extremity of its travel causes a port of said first pair to be connected with a port of said second pair, the remaining ports of each pair being likewise connected, the communication between the ports being interrupted when the said movable member is moved from its central position within the said bore.

7. A control device for a hydraulic circuit comprising a casing having ports adapted to receive external conduits and having a cylindrical bore therewithin, an axially movable member fitted within said cylindrical bore for movement relative to said casing, means for yieldably maintaining said movable member in a predetermined position with said bore, said casing having ports so arranged that when the said axially movable member is in said predetermined position a pair of said ports are directly interconnected with each other, the latter interconnection between the said ports being broken when the said axially movable member is moved from its predetermined position within the said bore, the said casing having all of said ports so arranged with respect to one another and with respect to the axially movable member that movement of the latter from said predetermined position causes two groups of said ports to be in communication with one another whereby two distinct fluid passageways are created through the said casing.

CORWIN W. BRYANT.